US012330433B2

(12) United States Patent
Sasaki et al.

(10) Patent No.: US 12,330,433 B2
(45) Date of Patent: Jun. 17, 2025

(54) PRINTING APPARATUS

(71) Applicant: SEIKO EPSON CORPORATION, Tokyo (JP)

(72) Inventors: Keisuke Sasaki, Matsumoto (JP); Haruki Miyasaka, Matsumoto (JP); Narihiro Oki, Matsumoto (JP)

(73) Assignee: Seiko Epson Corporation, Tokyo (JP)

(*) Notice: Subject to any disclaimer, the term of this patent is extended or adjusted under 35 U.S.C. 154(b) by 0 days.

(21) Appl. No.: 18/065,265

(22) Filed: Dec. 13, 2022

(65) Prior Publication Data

US 2023/0191811 A1 Jun. 22, 2023

(30) Foreign Application Priority Data

Dec. 16, 2021 (JP) ................................ 2021-204518

(51) Int. Cl.
*B41J 29/38* (2006.01)
*B41J 2/175* (2006.01)
*B41J 29/13* (2006.01)

(52) U.S. Cl.
CPC ........... *B41J 29/13* (2013.01); *B41J 2/17523* (2013.01); *B41J 29/38* (2013.01)

(58) Field of Classification Search
CPC ...... B41J 2/175; B41J 2/17509; B41J 13/106; B41J 29/02; B41J 29/13; B41J 29/38
See application file for complete search history.

(56) References Cited

U.S. PATENT DOCUMENTS 9,352,924 B2 5/2016 Hori
11,376,852 B2 7/2022 Kimura
2015/0217962 A1 8/2015 Hori
2016/0243855 A1* 8/2016 Hori ......................... B41J 29/02
2020/0238739 A1* 7/2020 Arakawa ................ B41J 25/006
2021/0016573 A1 1/2021 Kimura

FOREIGN PATENT DOCUMENTS

CN 104816553 8/2015
CN 112238680 1/2021
JP 2007-119172 * 5/2007
JP 2007-161370 A 6/2007
JP 2010006608 * 1/2010

* cited by examiner

*Primary Examiner* — Christopher E Mahoney
*Assistant Examiner* — Marissa Ferguson-Samreth
(74) *Attorney, Agent, or Firm* — WORKMAN NYDEGGER

(57) ABSTRACT

A printing apparatus includes an automatic opening mechanism for an opening/closing cover, a carriage that has a print head configured to perform printing on a medium and that moves in a direction intersecting a transport direction of the medium, and a discharge portion that is exposed in a state in which the opening/closing cover is opened and that discharges a printed material. The automatic opening mechanism includes a lever for releasing maintenance of a closed state of the opening/closing cover by movement of the carriage. The discharge portion discharges the printed material outside the apparatus. The automatic opening mechanism is arranged so as to overlap a discharge opening region of the discharge portion in a height direction.

8 Claims, 14 Drawing Sheets

PRINTING APPARATUS

The present application is based on, and claims priority from JP Application Serial Number 2021-204518, filed Dec. 16, 2021, the disclosure of which is hereby incorporated by reference herein in its entirety.

BACKGROUND

1. Technical Field

The present disclosure relates to a printing apparatus including an automatic opening mechanism for an opening/closing cover.

2. Related Art

An example of this type of printing apparatus is a printing apparatus disclosed in JP-A-2007-161370. JP-A-2007-161370 discloses a structure in which a paper discharge tray is automatically opened.

JP-A-2007-161370 discloses the structure in which the paper discharge tray is automatically opened, but no consideration is given to suppressing an increase in size of the apparatus when the structure in which the paper discharge tray is automatically opened is provided.

SUMMARY

A printing apparatus according to an aspect of the present disclosure is a printing apparatus including: an automatic opening mechanism for an opening/closing cover; a carriage that has a print head configured to perform printing on a medium and that moves in a direction intersecting a transport direction of the medium; and a discharge portion that is exposed in a state in which the opening/closing cover is opened and that discharges the printed medium. The automatic opening mechanism includes a lever for releasing maintenance of a closed state of the opening/closing cover by movement of the carriage, and the automatic opening mechanism is arranged so as to overlap a discharge opening region of the discharge portion in a height direction.

DESCRIPTION OF EXEMPLARY EMBODIMENTS

Figure 1:
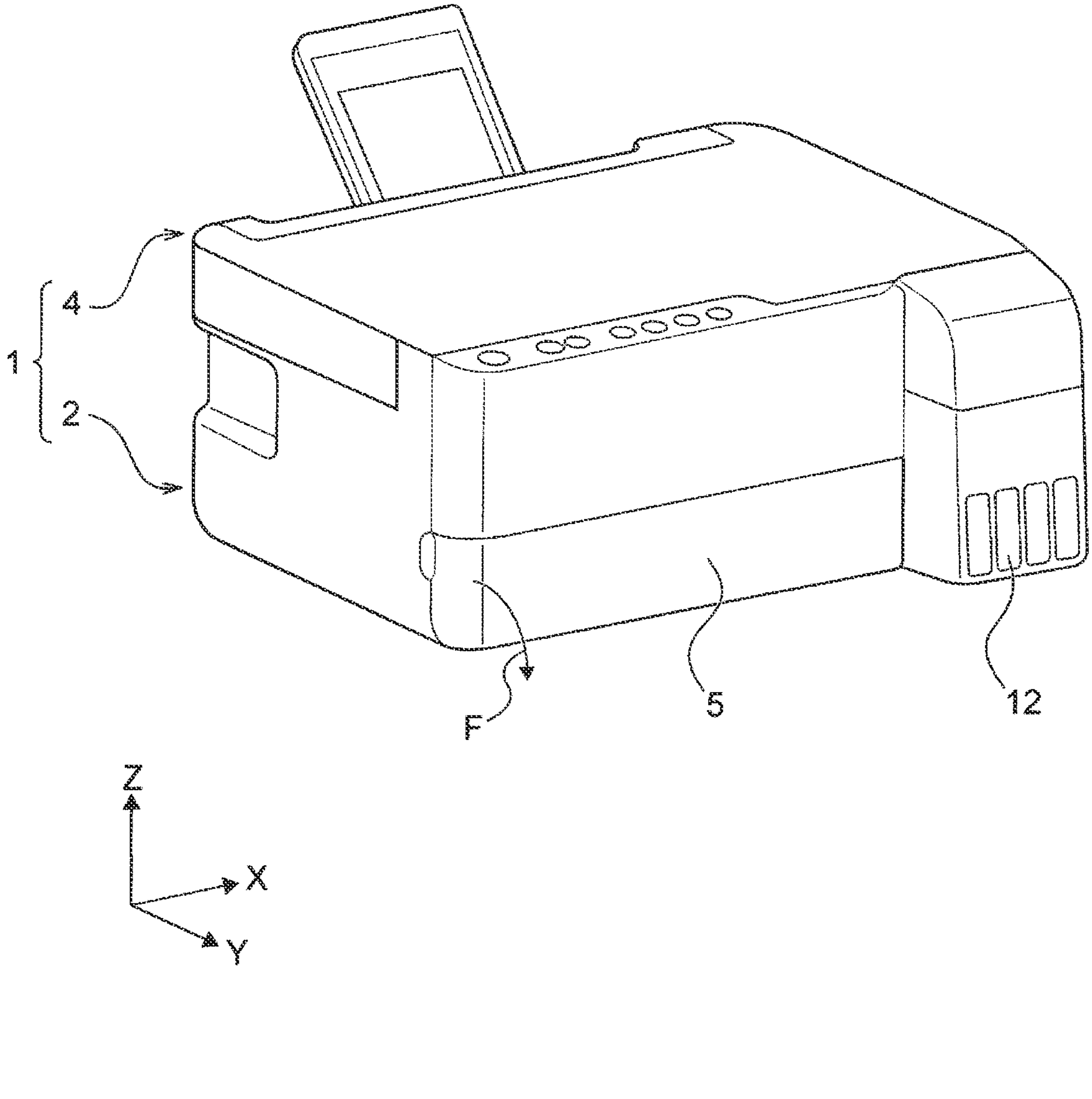
FIG. 1 is an external perspective view of a printing apparatus according to a first embodiment.

Hereinafter, the present disclosure will be schematically described first.

In order to solve the problem, a printing apparatus according to a first aspect of the present disclosure is a printing apparatus including: an automatic opening mechanism for an opening/closing cover; a carriage that has a print head configured to perform printing on a medium and that moves in a direction intersecting a transport direction of the medium; and a discharge portion that is exposed in a state in which the opening/closing cover is opened and that discharges the printed medium. The automatic opening mechanism includes a lever for releasing maintenance of a closed state of the opening/closing cover by movement of the carriage, and the automatic opening mechanism is arranged so as to overlap a discharge opening region of the discharge portion in a height direction.

Here, the expression "discharge opening region of the discharge portion" means a region between a discharge roller that discharges a printed material toward the outside of the apparatus and a receiving portion that is located below the discharge roller and that receives the discharged printed material.

In addition, the term "overlap" in the expression "overlap a discharge opening region of the discharge portion in a height direction" is used to mean that it is sufficient that a region occupied by members constituting the automatic opening mechanism at least partially overlap the discharge opening region in the height direction.

According to this aspect, the automatic opening mechanism is arranged so as to overlap the discharge opening region of the discharge portion for the printed material in the height direction. As a result, an increase in size of the printing apparatus in the height direction can be suppressed.

According to a second aspect of the present disclosure, the printing apparatus according to the first aspect further includes a discharge tray that is provided inside the opening/closing cover in a drawable manner and that receives a printed material discharged in a state in which the discharge tray is drawn out.

According to this aspect, the apparatus including the discharge tray that receives the printed material can provide the same advantages as that in the first aspect using the discharge tray as the receiving portion for the printed material.

According to a third aspect of the present disclosure, in the printing apparatus according to the first or second aspect, the automatic opening mechanism is arranged so as to overlap, in the height direction, a medium support member located opposite the print head.

According to this aspect, the automatic opening mechanism is arranged so as to overlap the medium support member in the height direction. As a result, an increase in size of the printing apparatus in the height direction can be suppressed.

According to a fourth aspect of the present disclosure, in the printing apparatus according to any one of the first to third aspects, the automatic opening mechanism is arranged so as to overlap, in the height direction, a disk scale provided on a shaft of a transport roller that transports a printed material in a transport direction.

According to this aspect, the automatic opening mechanism is arranged so as to overlap, in the height direction, the disk scale provided on the shaft of the transport roller. As a result, an increase in size of the printing apparatus in the height direction can be suppressed.

According to a fifth aspect of the present disclosure, in the printing apparatus according to the fourth aspect, the automatic opening mechanism is arranged so as to overlap, in the height direction, a motor that is a driving source of the transport roller.

According to this aspect, the automatic opening mechanism is arranged so as to overlap the motor for the transport roller in the height direction. As a result, an increase in size of the printing apparatus in the height direction can be suppressed.

According to a sixth aspect of the present disclosure, in the printing apparatus according to the fifth aspect, the automatic opening mechanism is arranged so as to overlap, in the height direction, a power transmission mechanism that transmits power of the motor.

According to this aspect, the automatic opening mechanism is arranged so as to overlap the power transmission mechanism in the height direction. As a result, an increase in size of the printing apparatus in the height direction can be suppressed.

According to a seventh aspect of the present disclosure, in the printing apparatus according to any one of the first to sixth aspects, the automatic opening mechanism is arranged so as to overlap, in a depth direction, an ink supply tube that supplies ink to the print head.

According to this aspect, the automatic opening mechanism is arranged so as to overlap the ink supply tube in the depth direction. As a result, an increase in size of the printing apparatus in the depth direction can be suppressed.

According to an eighth aspect of the present disclosure, in the printing apparatus according to any one of the first to seventh aspects, the automatic opening mechanism is arranged so as to overlap, in a depth direction, a partition hinge, for a scanner unit, that is formed at an upper portion of the printing apparatus.

According to this aspect, the automatic opening mechanism is arranged so as to overlap the partition hinge for the scanner unit in the depth direction. As a result, an increase in size of the printing apparatus in the depth direction can be suppressed.

According to a ninth aspect of the present disclosure, in the printing apparatus according to any one of the first to eighth aspects, the automatic opening mechanism is arranged so as to overlap an operation range of the carriage in a moving direction of the carriage.

According to this aspect, the automatic opening mechanism is arranged so as to overlap the operation range of the carriage in the moving direction of the carriage. As a result, an increase in size of the printing apparatus in the moving direction of the carriage can be suppressed.

First Embodiment

Hereinafter, an automatic opening mechanism for an opening/closing cover and a printing apparatus including the same according to a first embodiment will be specifically described with reference to FIGS. 1 to 9B.

In the following description, three axes orthogonal to one another represent an X axis, a Y axis, and a Z axis, respectively, as illustrated in the drawings. A Z-axis direction corresponds to a vertical direction, that is, a direction in which gravity acts. An X-axis direction and a Y-axis direction correspond to a horizontal direction. In the drawings, directions indicated by arrows of the three axes (X axis, Y axis, and Z axis) are + directions in the respective directions.

Figure 2:
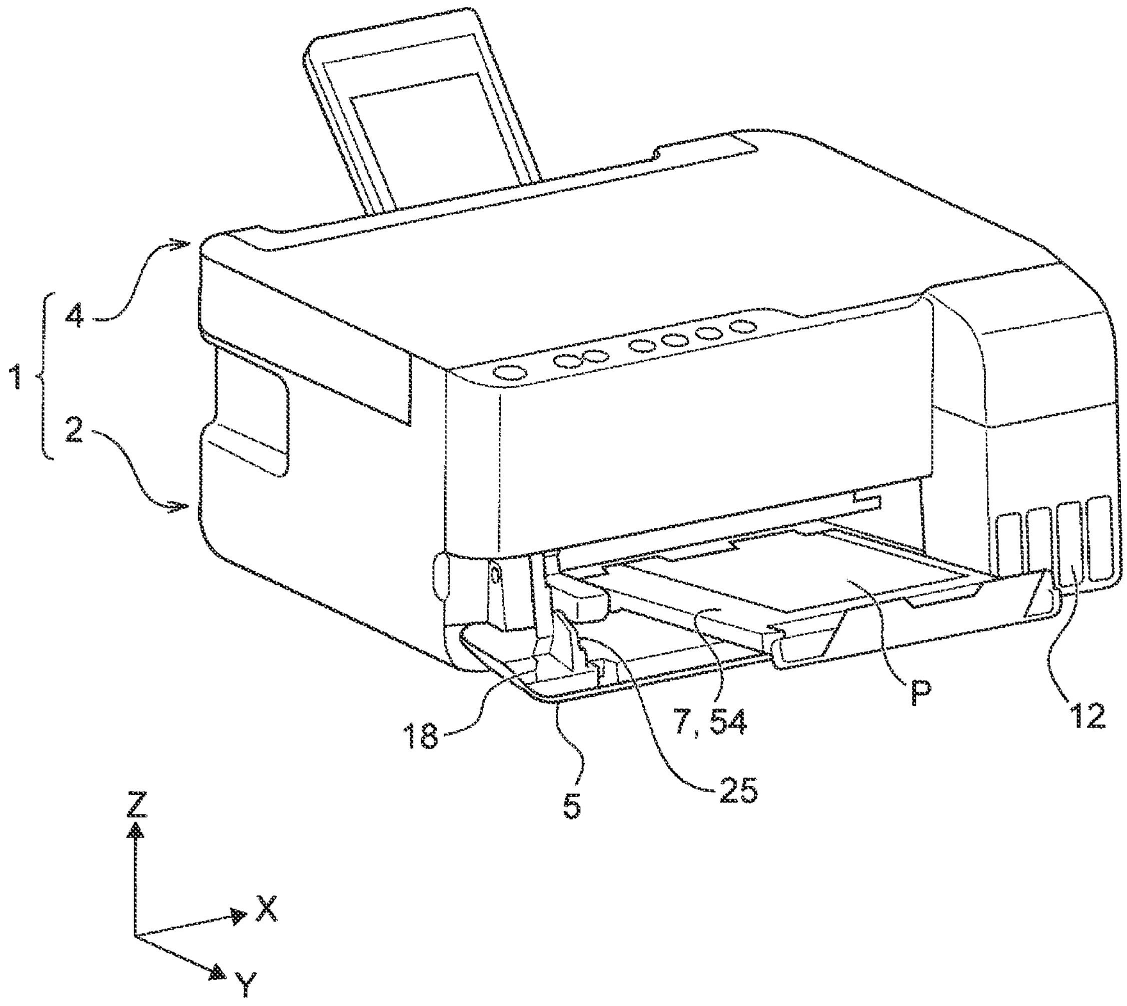
FIG. 2 is an external perspective view of a state in which an opening/closing cover is opened in the first embodiment.
Figure 3:
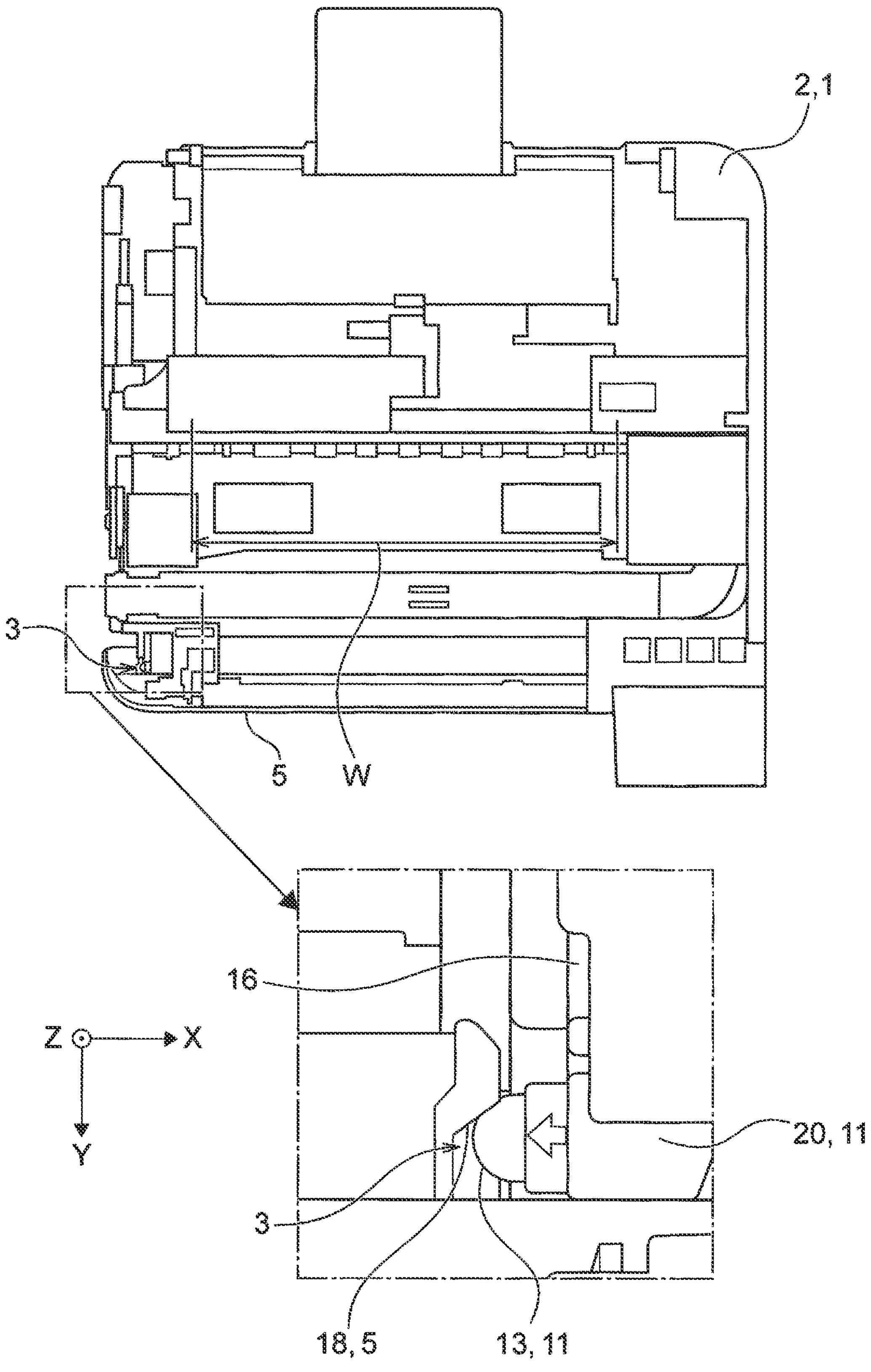
FIG. 3 is an overall plan view in which a relevant portion inside the printing apparatus of the first embodiment is visible.

As illustrated in FIGS. 1 to 3, a printing apparatus 1 according to the present embodiment includes an automatic opening mechanism 3 (FIG. 3) for an opening/closing cover. In addition, the printing apparatus 1 includes a carriage 15 that has a print head 65 configured to perform printing on a medium P and that moves in a direction intersecting a transport direction of the medium P. FIG. 2 illustrates a state in which an opening/closing cover 5 located in a front side (+Y direction) of the printing apparatus 1 is opened, and a state in which a discharge tray 7 accommodated inside the apparatus 1 is drawn out. The printing apparatus 1 is configured so that the discharge tray 7 for receiving the medium P (hereinafter referred to as "printed material P") can be operated by opening the opening/closing cover 5. Furthermore, the printing apparatus 1 may be configured so that a feeding cassette (not illustrated) for accommodating a printing medium can be operated.

The printing apparatus 1 is a multi-function device including an ink jet printer 2 located on a lower side thereof and a scanner unit 4 located on an upper side thereof. In addition, the opening/closing cover 5 is located at a position adjacent to ink tanks 12 of the printing apparatus 1. Ink can be injected into the ink tanks 12.

As illustrated in FIGS. 4 to 7, in the present embodiment, the automatic opening mechanism 3 for the opening/closing cover 5 includes a lever 11 that is rotatable via a rotation fulcrum 9, a locking portion 13 that is located on one end of the lever 11 and that is locked to the opening/closing cover 5 in a closed state, which receives a force F (FIGS. 1 and 8) in a direction in which the opening/closing cover 5 is opened, to maintain the closed state of the opening/closing cover 5, and a power receiving portion 17 that is located on the other end of the lever 11 and that comes into contact with a carriage 15 (FIG. 7), which moves in the horizontal direction, and receives power of the carriage 15.

The lever 11 is configured so that it rotates as the carriage 15 comes into contact with the power receiving portion 17 and pushes the power receiving portion 17, and releases the maintenance of the closed state of the opening/closing cover 5 by the locking portion 13.

Hereinafter, each component will be described in detail.

Lever of Automatic Opening Mechanism

Figure 4:
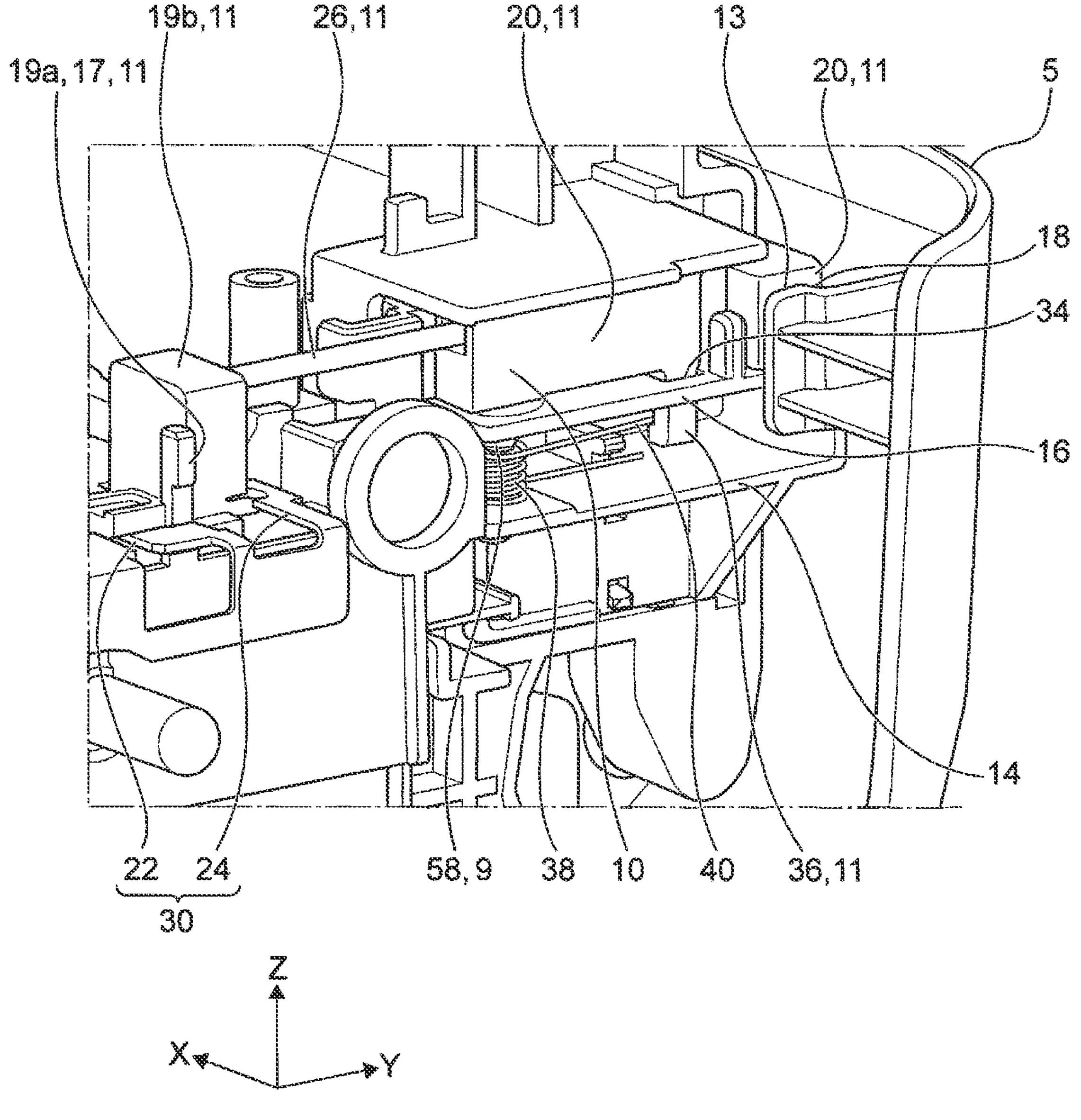
FIG. 4 is an enlarged perspective view of the relevant portion of the first embodiment as viewed obliquely from the rear.
Figure 5:
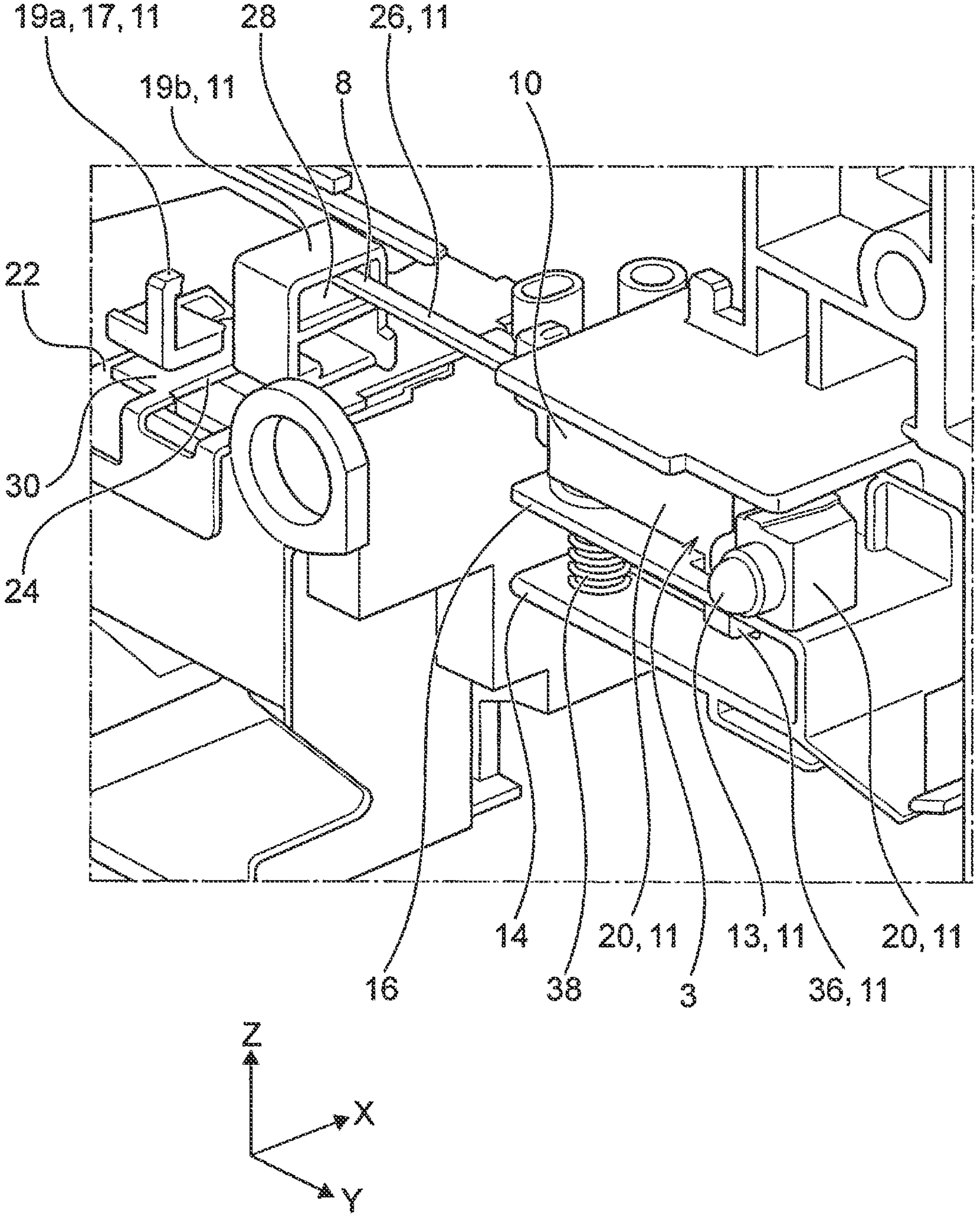
FIG. 5 is an enlarged perspective view of the relevant portion of the first embodiment as viewed obliquely from the front.
Figure 6:
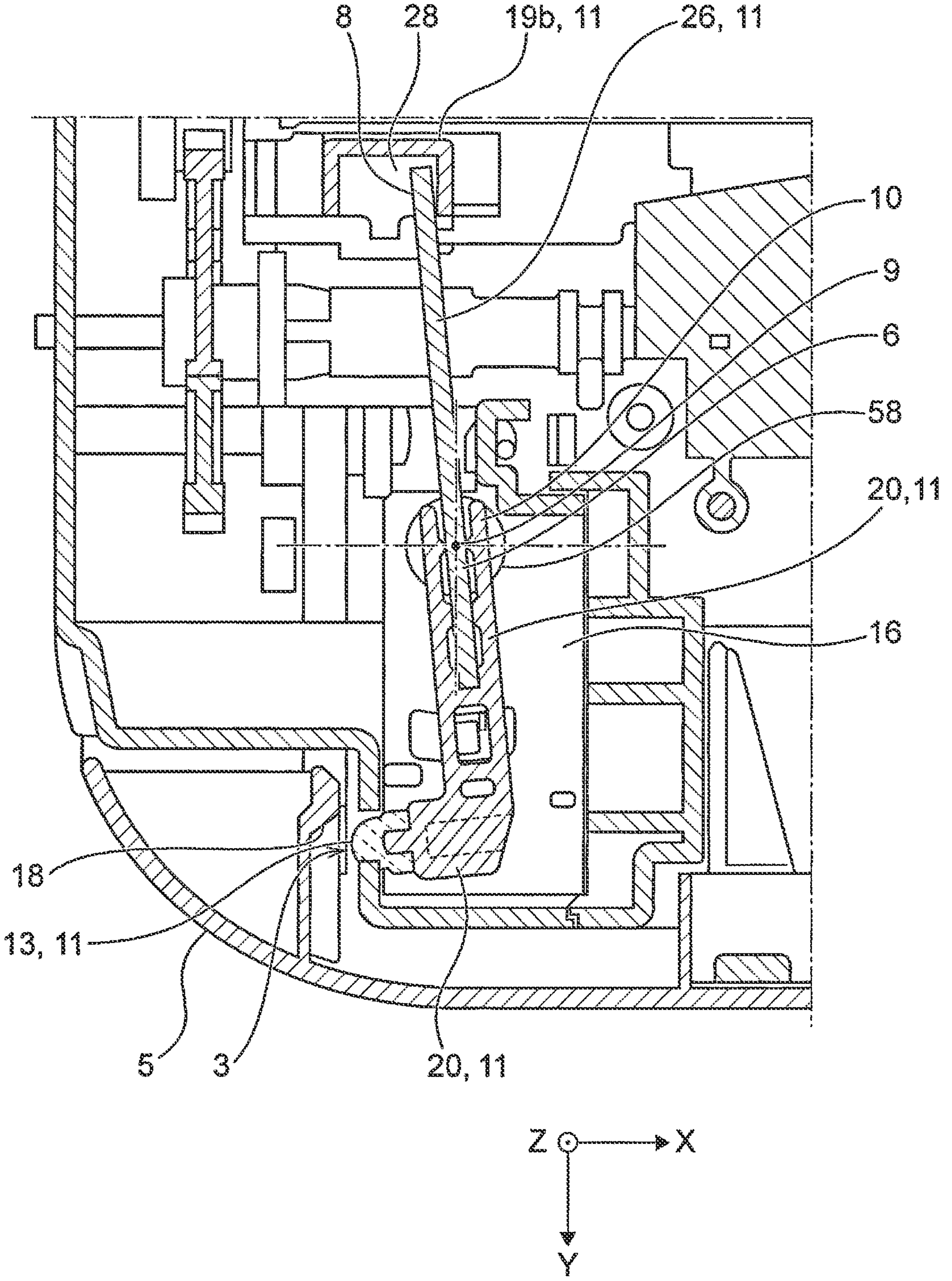
FIG. 6 is an enlarged plan view of a relevant portion of a lever section of the first embodiment.

In the present embodiment, the lever 11 has a shape extending in the Y-axis direction as the horizontal direction, as illustrated in FIGS. 4 to 6.

The locking portion 13, which is locked to a locked portion 18 (FIGS. 2 to 4 and FIG. 6) of the opening/closing cover 5 in the closed state, is provided on one end of the lever 11. FIG. 6 illustrates a state in which the locking portion 13 of the lever 11 is separated from the locked portion 18 of the opening/closing cover 5. The locking portion 13 is formed in a convex curved shape protruding in the −X direction and is formed integrally with a resin locking portion body 20 extending in the Y-axis direction. The locking portion 13 is provided on a side surface of a tip end portion of the locking portion body 20 in the +Y direction.

Moreover, the power receiving portion 17 for receiving the power of the moving carriage 15 is provided on the other end of the lever 11. In the present embodiment, the power receiving portion 17 includes a sliding portion 19 that is pushed by the carriage 15 and slides. The sliding portion 19 includes two portions 19*a* and 19*b* whose bottom surfaces are guided by two guide grooves 22 and 24 (FIG. 5) of a frame 30, respectively. The two portions 19*a* and 19*b* of the sliding portion 19 are integrally coupled, and integrally move in the X direction, which is the moving direction of the carriage 15.

The sliding portion 19*a* guided by the guide groove 22 is configured as the power receiving portion 17.

In the present embodiment, the sliding portion 19*b* guided by the guide groove 24 is coupled to the locking portion body 20 via a power transmission shaft 26 made of metal. One end 6 (FIG. 6) of the power transmission shaft 26 is integrally coupled and fixed to a base end portion 10 of the locking portion body 20, and the other end 8 (FIG. 6) thereof is inserted into a recessed portion 28 of the sliding portion 19*b* and is coupled in a non-fixed state in which the other end 8 is in contact with an inner surface of the recessed portion 28.

When the sliding portion 19*a* is pushed by the carriage 15 to move the integrated sliding portion 19*b* in the −X direction, the other end 8 of the power transmission shaft 26 moves in a state in which the other end 8 is in contact with the inner surface of the recessed portion 28. As a result, the lever 11 can rotate around the rotation fulcrum 9. That is, a horizontal linear motion of the carriage 15 is converted into a rotational motion of the lever 11 and is transmitted.

Rotation Structure of Lever of Automatic Opening Mechanism

The lever 11 is rotatably attached to a rotation fulcrum shaft 58, which forms the rotation fulcrum 9, in a horizontal plane. The rotation fulcrum 9 is formed at the axial center of the rotation fulcrum shaft 58. In the present embodiment, the rotation fulcrum shaft 58 is fixed to a lower plate 14 and an upper plate 16, which are apparatus structure members, in a direction extending in a vertical direction.

The locking portion body 20 of the lever 11 is located on an upper surface 32 of the upper plate 16, and a bottom portion of the base end portion 10 is rotatably coupled to the rotation fulcrum shaft 58. A through-hole 34 (FIG. 4) is formed near the locking portion 13 of the upper plate 16, and a projection portion 36 provided on the locking portion body 20 is inserted into the through-hole 34 so as to extend therethrough. The through-hole 34 is formed in a size and a shape in which the locking portion body 20 can rotate around the rotation fulcrum 9 on the base end portion 10 side.

A torsion coil spring 38 (FIG. 4) is provided between the lower plate 14 and the upper plate 16, and one end 40 of the torsion coil spring 38 is locked to the projection portion 36 of the locking portion body 20. As a result, the locking portion body 20 is configured so that a spring force of the torsion coil spring 38 is received to rotate the locking portion 13 in a direction in which the locking portion 13 is locked to the locked portion 18 of the opening/closing cover 5.

Figure 7:
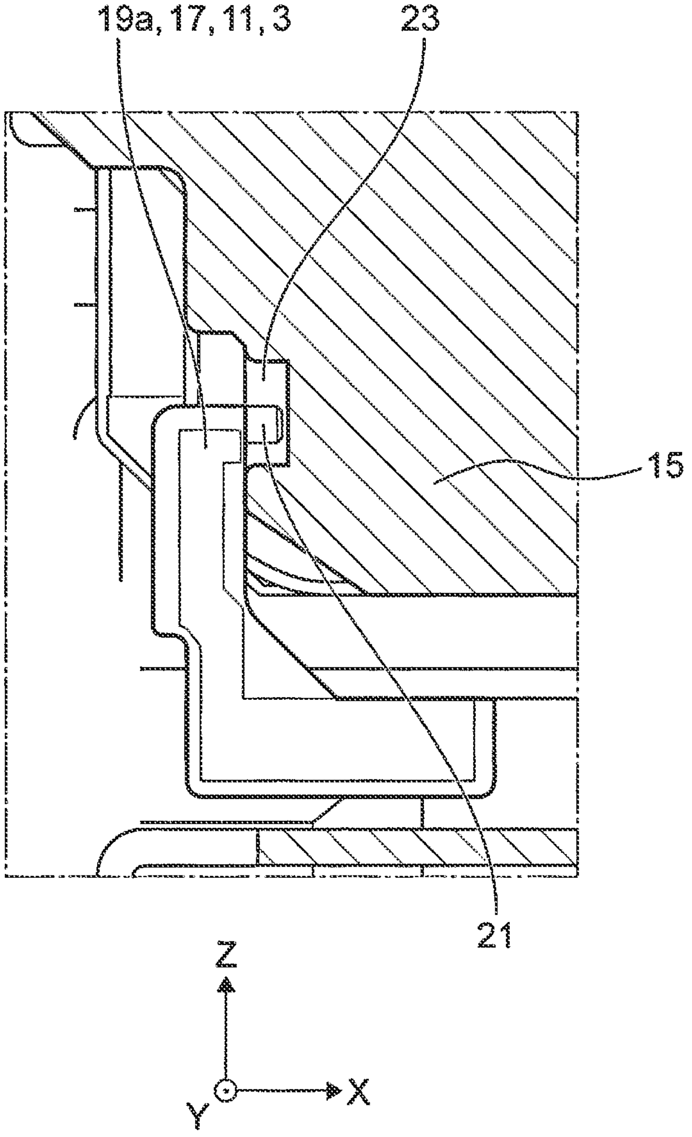
FIG. 7 is a schematic enlarged side sectional view of a relevant portion of a power receiving portion in the first embodiment.

As illustrated in FIG. 7, in the present embodiment, the sliding portion 19*a* has a contact projection portion 21 that comes into contact with the carriage 15, and the carriage 15 has a contact recessed portion 23 provided at a position in which the carriage 15 comes into contact with the contact projection portion 21. The sliding portion 19*a* of the lever 11 is in a state in which the contact projection portion 21 is inserted into the contact recessed portion 23 when pushed by the carriage 15, and the sliding portion 19*a* easily moves integrally with the carriage 15.

Figure 8:
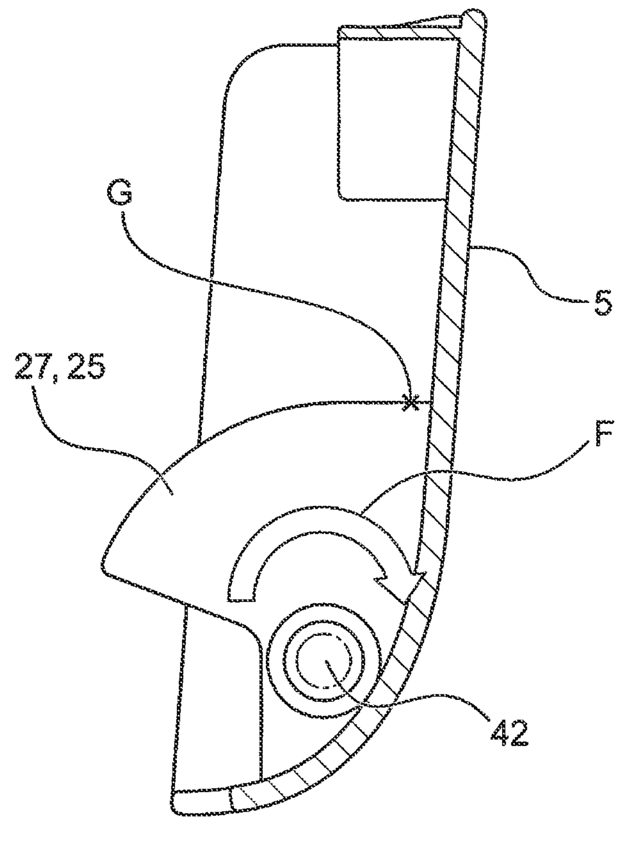
FIG. 8 is an enlarged side sectional view of the opening/closing cover of the first embodiment.

As illustrated in FIG. 8, in the present embodiment, the opening/closing cover 5 has a structure having a self-weight moment on an opening side thereof. Specifically, a position of the center of gravity G of the opening/closing cover 5 is set so as to be opened by its own weight with respect to an opening/closing fulcrum 42.

That is, since the force F in the direction in which the opening/closing cover 5 is opened is generated by the weight of the opening/closing cover 5, the opening/closing cover 5 is configured to be automatically opened by the action of its own weight when the closed state of the opening/closing cover 5 is released.

The force F in the direction in which the opening/closing cover 5 is opened is not limited to a structure using the self-weight moment. For example, the force F in the direction in which the opening/closing cover 5 is opened may be applied by using elasticity of a spring.

Figure 9A:
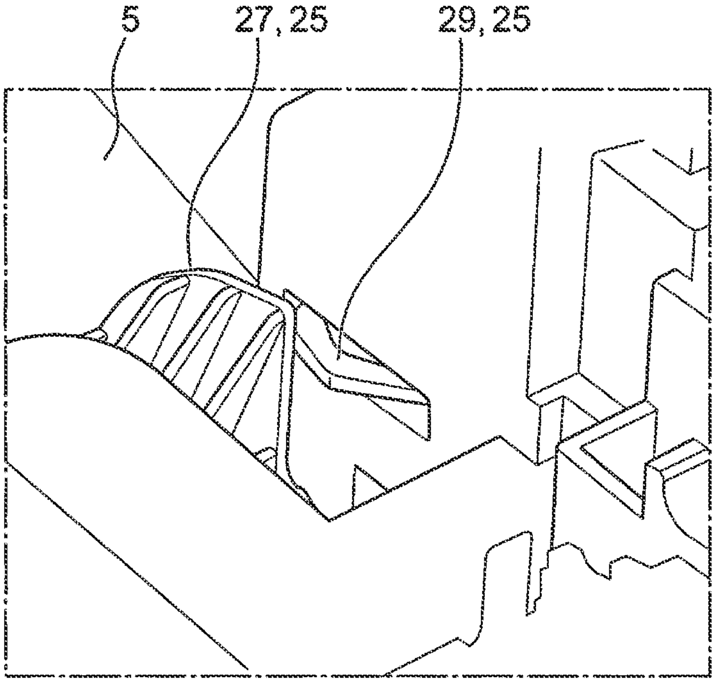
FIGS. 9A and 9B are perspective views of a relevant portion of a sensor section of the first embodiment.
Figure 9B:
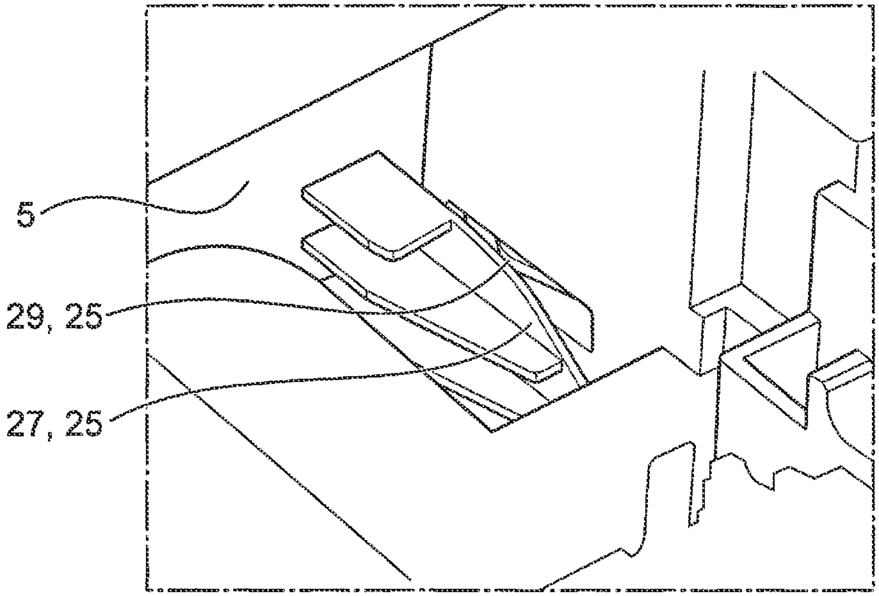

As illustrated in FIGS. 9A and 9B, in the present embodiment, the printing apparatus 1 includes a sensor 25 for detecting the opened/closed state of the opening/closing cover 5. Here, the sensor 25 includes an action piece 27 provided on the inner surface of the opening/closing cover 5, and a detection piece 29 provided in a state in which it is pressed against the apparatus structure members of the printing apparatus 1 in an outward direction.

FIG. 9A corresponds to a state in which detection by the sensor 25 is OFF. That is, since the action piece 27 does not push the detection piece 29, the sensor 25 is in a state of detecting that the opening/closing cover 5 is open. A range in which the sensor 25 detects that the opening/closing cover 5 is open is set to an angle at which a printed material to be discharged does not cause a jam even if the opening of the opening/closing cover 5 is stopped partway. Here, the angle is set to 70 degrees.

FIG. 9B corresponds to a state in which detection by the sensor 25 is ON. That is, since the action piece 27 pushes the detection piece 29, the sensor 25 is in a state of detecting that the opening/closing cover 5 is closed.

In the present embodiment, an operation for releasing the maintenance of the closed state of the opening/closing cover 5 is controlled to be executed after a main switch of the printing apparatus 1 is turned on and before a printing operation is started. This means that the control portion (not illustrated) is configured to execute the releasing operation when the main switch of the printing apparatus 1 is turned on, which serves as a trigger.

That is, the printing apparatus is configured so that the operation for releasing the maintenance of the closed state of the opening/closing cover 5 is executed at a right timing.

Alternatively, the printing apparatus 1 may be configured so that when the closed state of the opening/closing cover 5 is detected, the printing operation is stopped, and the operation for releasing the closed state of the opening/closing cover 5 is executed. Even if the opening/closing cover 5 is closed during the printing operation, the opening/closing cover 5 can be opened after stopping the printing operation, and the printing operation can be re-started.

In the present embodiment, the carriage 15 reciprocates when the printing is executed, and the automatic opening mechanism 3 for the opening/closing cover 5 is located outside a reciprocation range W of the carriage 15.

Specifically, as illustrated in FIG. 3, the automatic opening mechanism 3 for the opening/closing cover 5 is arranged outside the reciprocation range W with respect to the reciprocation range W when the carriage 15 executes printing. That is, the automatic opening mechanism 3 is provided in the printing apparatus 1 so as not to affect a structure that performs the printing operation.

Restriction of Movement of Carriage by Wall Member

Figure 10:
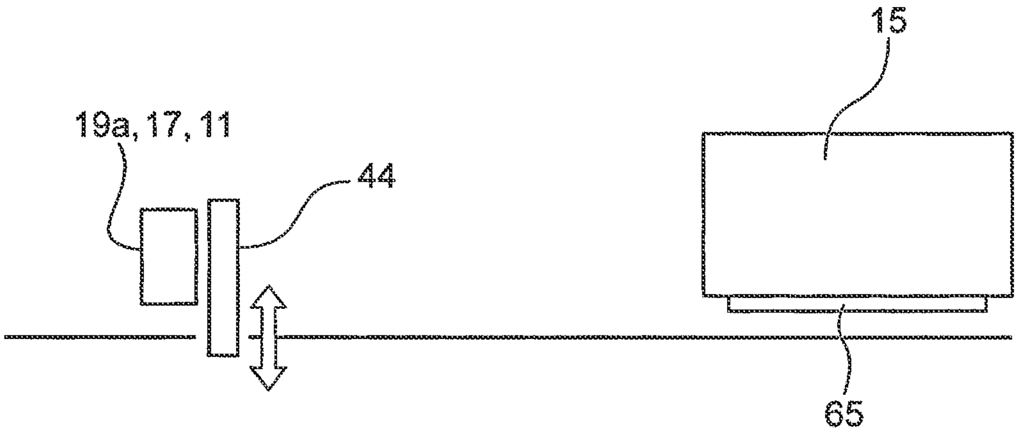
FIG. 10 is a schematic view of a structure in which a wall member is provided in front of the lever of the first embodiment in a protrusible and retractable manner.

As illustrated in FIG. 10, in the present embodiment, a wall member 44 is provided in front of the power receiving portion 17 of the lever 11, that is, in front of the sliding portion 19*a*, in a vertically protrusible and retractable manner. When the opening/closing cover 5 is opened by moving the carriage 15 to operate the automatic opening mechanism 3, the wall member 44 is retracted, that is, lowered and retracted downwardly.

On the other hand, when the automatic opening mechanism 3 is not operated, the wall member 44 protrudes, that is, is raised upwardly. For example, when the carriage 15 is moved in order to detect the position of the carriage 15, the carriage 15 is brought into contact with the wall member 44 once to detect the position. In this case, the carriage 15 comes into contact with the wall member 44 and does not come into contact with the power receiving portion 17 of the lever 11, so that it is possible to suppress the unintentional operation of the automatic opening mechanism 3.

The protrusion and retraction of the wall member 44 can be performed using a power source such as a motor of the printing apparatus 1. Reference numeral 65 represents a print head.

Control of Movement Range of Carriage by Current Value

Figure 11:
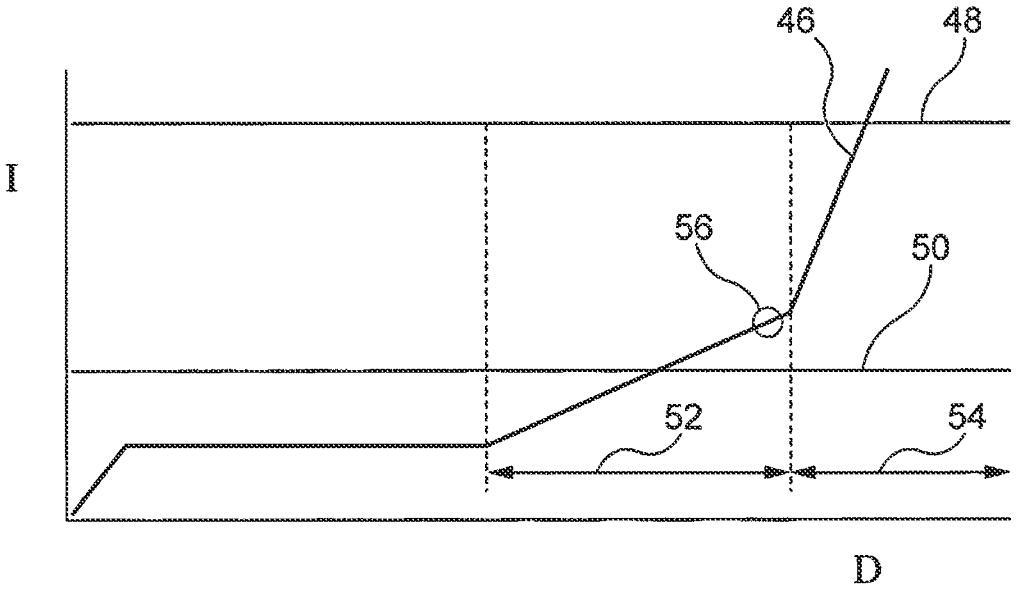
FIG. 11 is a graph showing a threshold of a current value for controlling a movement range of a carriage in the first embodiment.

FIG. 11 is a graph showing a threshold of a current value for controlling a movement range of the carriage 15. A horizontal axis represents a movement distance D of the carriage 15 from an origin, and a vertical axis represents a value I of the current flowing through the carriage 15.

When the carriage 15 starts moving from the origin and comes into contact with the power receiving portion 17 of the lever 11 of the automatic opening mechanism 3, the carriage 15 moves against the spring force of the torsion coil spring 38, so that the value I of the current flowing through the carriage 15 starts to rise. Reference numeral 46 in FIG. 11 represents a change in the value I of the current flowing through the carriage 15 at that time.

Reference numeral 56 represents a position of the carriage 15 where the maintenance of the closed state of the opening/closing cover 5 is released, that is, a position where the locking portion 13 of the lever 11 is unlocked from the locked portion 18 and the opening/closing cover 5 starts to transition to the opened state. Reference numeral 50 represents a first threshold, and reference numeral 48 represents a second threshold. The first threshold 50 is set in a region 52 from a position where the carriage 15 comes into contact with the power receiving portion 17 of the lever 11 to a position 56 where the opening/closing cover 5 starts to be opened, and the second threshold 48 is set in a region 54 after the opening/closing cover 5 starts to be opened.

As can be understood from FIG. 11, the region 52 is a region where, in a portion that is closer to the origin than is the position 56, the carriage 15 is in contact with the power receiving portion 17 of the lever 11, but the amount of rotation of the lever 11 is still small, and the opening/closing cover 5 is maintained in the closed state. The first threshold 50 set in the region 52 can be used for detecting the position of the carriage 15 without operating the automatic opening mechanism 3. In FIG. 10, the position of the carriage 15 is detected by bringing the carriage 15 into contact with the wall member 44 once, but in FIG. 11, the position of the carriage 15 is detected by detecting the first threshold 50.

On the other hand, since the opening/closing cover 5 is being opened in the region 54, the second threshold 48 set in the region 54 can be used for detecting the opened state of the opening/closing cover 5.

Operation of Automatic Opening Mechanism for Opening/Closing Cover

With the opening/closing cover 5 illustrated in FIG. 1 in the closed state, the carriage 15 first moves in the −X direction, comes into contact with the power receiving portion 17 of the sliding portion 19*a* of the lever 11, and further pushes the power receiving portion 17. The lever 11 rotates around the rotation fulcrum 9 by receiving the power to move the carriage 15 in the −X direction. Due to the rotation of the lever 11, the locking portion 13 of the lever 11 is separated from the locked portion 18 of the opening/closing cover 5. Thereafter, the opening/closing cover 5 is opened by its own weight and becomes the state illustrated in FIG. 2. In FIG. 2, the discharge tray 7 is further drawn out.

Description of Advantages of Embodiment (1) According to the automatic opening mechanism 3 of the present embodiment, the lever 11 rotates as the carriage 15 comes into contact with the power receiving portion 17 and pushes the power receiving portion 17, and releases the maintenance of the closed state of the opening/closing cover 5 by the locking portion 13 due to the rotation of the lever 11. After this release, since the opening/closing cover 5 receives the force F in the direction in which the opening/closing cover 5 is opened, the opening/closing cover 5 transitions from the closed state to the opened state due to the action of the force F. Accordingly, since the power of the carriage 15 is used, there is no need to add new power, so that cost reduction in the mechanism for automatically opening the opening/closing cover 5 can be realized, and furthermore, space saving can be realized.

(2) According to the present embodiment, since the opening/closing cover 5 has a structure with the self-weight moment on the opening side, when a locked state is released by the locking portion 13, the opening/closing cover 5 transitions from the closed state to the opened state due to its own weight. As a result, there is no need to provide a mechanism for performing an opening operation of the opening/closing cover 5, and cost reduction can be realized.

(3) According to the present embodiment, the printing apparatus 1 further includes the sensor 25 for detecting the opened/closed state of the opening/closing cover 5. As a result, unnecessary movement, such as operating the automatic opening mechanism 3 in a state in which the opening/closing cover 5 is already opened, can be eliminated, and usability is improved.

(4) According to the present embodiment, the power receiving portion 17 of the lever 11 is the sliding portion 19 (19*a* and 19*b*) that is pushed by the carriage 15 and slides. As a result, since the lever 11 receives the power of the carriage 15 in such a manner that the sliding portion 19 slides, the power of the carriage 15 can be effectively used.

(5) According to the present embodiment, the sliding portion 19*a* is in a state in which the contact projection portion 21 of the sliding portion 19*a* is inserted into the contact recessed portion 23 of the carriage 15, when the sliding portion 19*a* is pushed by the carriage 15. As a result, the sliding portion 19*a* can easily move integrally with the carriage 15, and a risk that the sliding portion 19*a* is caught in the carriage 15 can be reduced.

(6) The printing apparatus 1 of the present embodiment includes the print head 65 mounted on the carriage 15 and the opening/closing cover 5 receiving the force F in the direction in which the opening/closing cover 5 is opened and includes the automatic opening mechanism 3 with the above-described configuration for the opening/closing cover 5. As a result, the advantages of the automatic opening mechanism 3 described as the printing apparatus 1 can be obtained.

(7) According to the present embodiment, the carriage 15 reciprocates when printing is executed, and the automatic opening mechanism 3 is located outside the reciprocation range W of the carriage 15. As such, the automatic opening mechanism 3 exists independently of a normal printing operation of the printing apparatus 1. That is, the automatic opening mechanism 3 can be provided in the printing apparatus 1 so as not to affect the structure that performs the printing operation, and it is possible to easily manufacture both a type of apparatus including the automatic opening mechanism 3 and a type of apparatus not including the automatic opening mechanism 3.

(8) According to the present embodiment, the opening/closing cover 5 is opened, so that the discharge tray 7 for receiving the printed material P, or the like, can be operated. As a result, it is possible to reduce a risk of damage or malfunction caused by unintentionally touching the discharge tray 7 for receiving the printed material P, or the like.

(9) According to the present embodiment, when the closed state of the opening/closing cover 5 is detected during the printing operation, the printing operation is stopped, and the operation for releasing the closed state of the opening/closing cover 5 is executed. As a result, even if the opening/closing cover 5 is closed during the printing operation, the opening/closing cover 5 can be opened after stopping the printing operation, and the printing operation can be re-started.

(10) According to the present embodiment, the operation for releasing the maintenance of the closed state of the opening/closing cover 5 is executed after a main switch of the printing apparatus 1 is turned on and before the printing operation is started. As a result, since the operation for releasing the maintenance of the closed state of the opening/closing cover 5 is executed at a right timing, the opening/closing cover 5 can be prevented from being opened unintentionally.

Second Embodiment

Next, a printing apparatus according to a second embodiment will be specifically described with reference to FIGS. 12 to 15. The same reference numerals will be given to the same portions as in the first embodiment, and descriptions thereof will be omitted.

Figure 12:
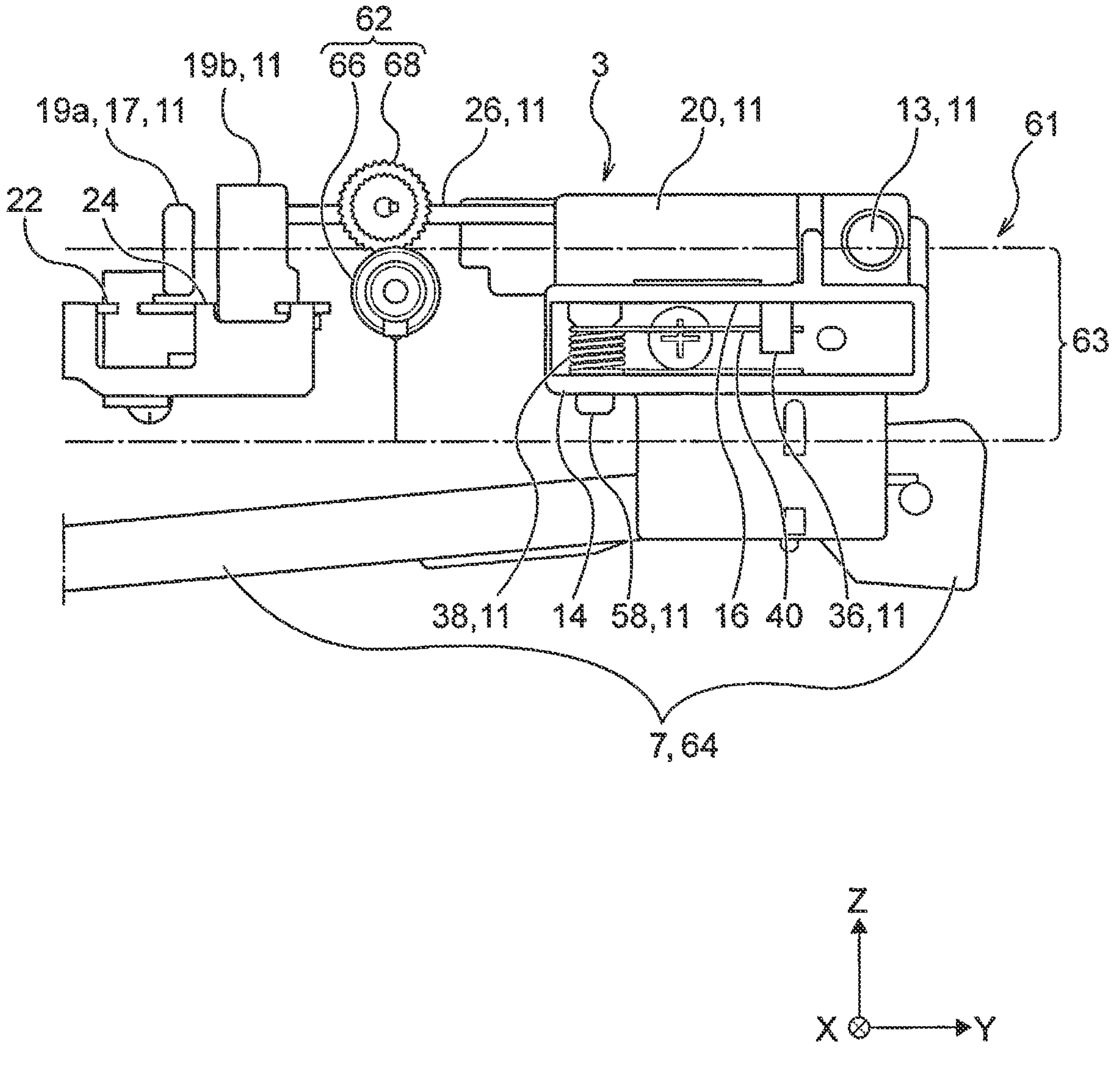
FIG. 12 is a side view of a relevant portion of a printing apparatus according to a second embodiment.

As illustrated in FIGS. 2 and 12, a printing apparatus 1 according to the present embodiment includes a carriage 15 that has a print head 65 configured to perform printing on a medium P and that moves in a direction intersecting a transport direction of the medium P, and an automatic opening mechanism 3 for an opening/closing cover. The automatic opening mechanism 3 includes a lever 11 that rotates by receiving power of the carriage 15 and releases maintenance of a closed state of an opening/closing cover 5. In the present embodiment, the specific structure of the automatic opening mechanism 3 is identical to that of the first embodiment; therefore, the same reference numerals will be given to the same portions as in the first embodiment, and descriptions thereof will be omitted. It should be understood that the specific structure of the automatic opening mechanism 3 is not limited to the structure described above.

In the present embodiment, the printing apparatus 1 includes a discharge portion 61 that is exposed in a state in which the opening/closing cover 5 is opened and that discharges a medium, that is, a printed material P. The discharge portion 61 discharges the printed material P outside the apparatus 1 (+Y direction). The automatic opening mechanism 3 is arranged so as to overlap a discharge opening region 63 of the discharge portion 61 in the height direction.

Here, as illustrated in FIG. 12, the expression "discharge opening region 63 of the discharge portion 61" means a region between a discharge roller 62 that discharges the printed material P toward the outside of the apparatus 1 and a receiving portion 64 that is located below the discharge roller 62 and that receives the discharged printed material P. The discharge roller 62 is composed of a pair of a drive roller 66 and a driven roller 68, the printed material P is nipped between the pair of the drive roller 66 and the driven roller 68, and a feeding force is applied in a discharging direction (+Y direction). In the present embodiment, the receiving portion 64 includes a discharge tray 7 that is provided inside the opening/closing cover 5 in a drawable manner and that receives the printed material P discharged in a state in which the discharge tray 7 is drawn out. As illustrated in FIG. 2, the discharge tray 7 is located above the opening/closing cover 5 in the opened state, in a state in which the discharge tray 7 is drawn out.

FIG. 12 illustrates a state in which the receiving portion 64 is accommodated in the apparatus 1 before the receiving portion 64 is drawn out, and FIG. 2 illustrates a state in which the receiving portion 64 is drawn out.

In addition, the term "overlap" in the expression "overlap a discharge opening region 63 of the discharge portion 61 in a height direction" is used to mean that it is sufficient that a region occupied by members constituting the automatic opening mechanism 3 at least partially overlap the discharge opening region 63 in the height direction (Z-axis direction).

In the present embodiment, the members constituting the automatic opening mechanism 3 include a locking portion body 20 having a locking portion 13 and a projection portion 36 constituting a lever 11, a sliding portion 19 (19*a* and 19*b*) having a power receiving portion 17, a rotation fulcrum shaft 58 having a torsion coil spring 38, and a power transmission shaft 26.

Figure 13:
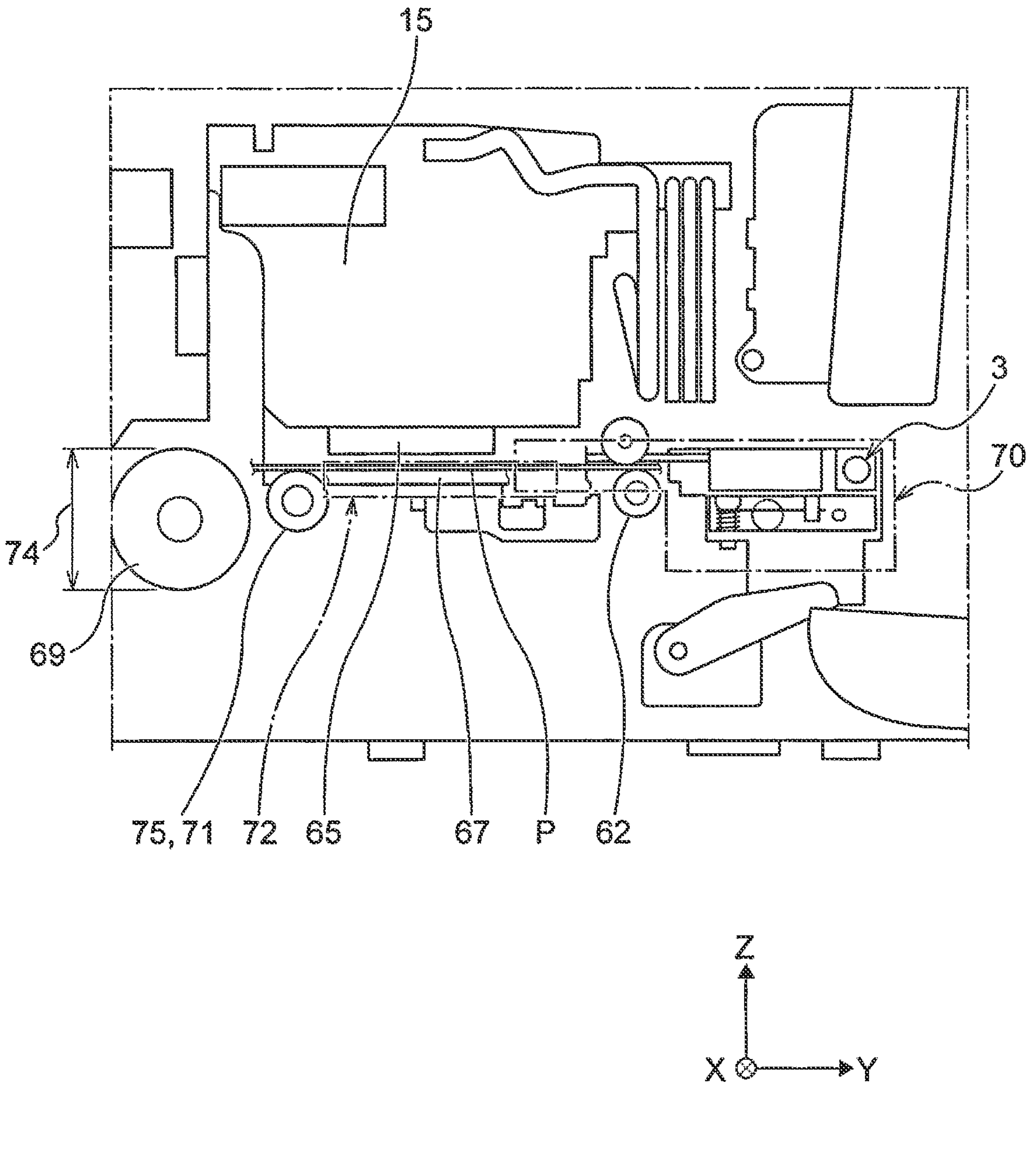
FIG. 13 is a side view of the relevant portion of the printing apparatus according to the second embodiment.

As illustrated in FIG. 13, in the present embodiment, the automatic opening mechanism 3 is arranged so as to overlap, in the height direction, a platen 67 that is a medium support member located opposite the print head 65. In FIG. 13, the region occupied by the members constituting the automatic opening mechanism 3 is surrounded by a frame 70 for easy understanding.

The print head 65 is mounted on the carriage 15. The platen 67 supports a printing medium (not illustrated) transported along a transport path from therebelow when the printing medium passes through a print region of the print head 65.

In the present embodiment, the automatic opening mechanism 3 is arranged so as to overlap, in the height direction, a motor 69 that is a driving source of a transport roller 75. In FIG. 13, reference numeral 74 represents a region occupied by the motor 69 in the height direction.

In FIG. 13, the region occupied by the members constituting the platen is surrounded by a frame 72 for easy understanding. A gear train for transmitting the power of the motor 69 as the driving source to the transport roller 75 will be described later.

Figure 14:
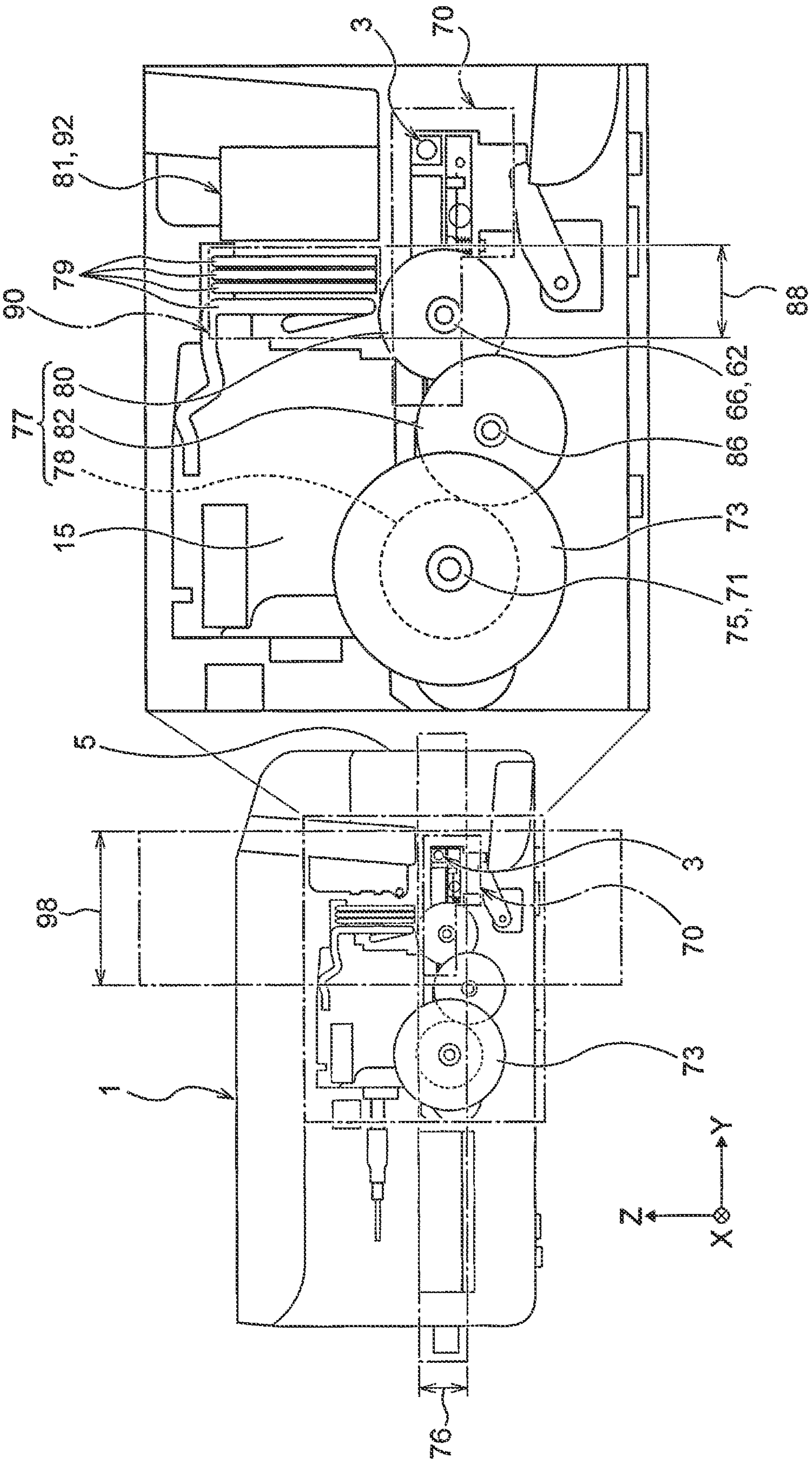
FIG. 14 is a side view of the relevant portion of the printing apparatus according to the second embodiment, in which the relevant portion is partially enlarged.

As illustrated in FIG. 14, which is partially enlarged, in the present embodiment, the automatic opening mechanism 3 is arranged so as to overlap, in the height direction, a disk scale 73 provided on a shaft 71 of a transport roller 75 that transports the printed material P in the transport direction (+Y direction). Reference numeral 76 represents a region in which the automatic opening mechanism 3 and the disk scale 73 overlap.

The disk scale 73 is used to detect an amount of transport of the printed material P by the transport roller 75, and is formed with a known structure having a slit pattern on a peripheral portion thereof.

As illustrated in FIG. 14, in the present embodiment, the automatic opening mechanism 3 is arranged so as to overlap, in the height direction, a gear train 77 that is a power transmission mechanism for transmitting the power of the motor 69. In the present embodiment, the gear train 77 includes a transport gear 78 mounted on the shaft 71 of the transport roller 75, a discharge gear 80 mounted on a shaft 84 of the discharge roller 62, and a coupling gear 82 coupling both gears 78 and 80. Reference numeral 86 represents a shaft of the coupling gear 82.

Reference numeral 76 described above also represents a region in which the automatic opening mechanism 3 and the gear train 77 overlap.

As illustrated in FIG. 14, in the present embodiment, the automatic opening mechanism 3 is arranged so as to overlap, in a depth direction (Y-axis direction), ink supply tubes 79 that supply ink to the print head 65. The ink supply tubes 79 are tubes for inks of four colors, namely, cyan, magenta, yellow, and black, in the present embodiment.

In FIG. 14, a region occupied by the ink supply tubes 79 in the depth direction is surrounded by a frame 90 for easy understanding. Reference numeral 88 represents a region in which the automatic opening mechanism 3 and the ink supply tubes 79 overlap.

As illustrated in FIG. 14, in the present embodiment, the automatic opening mechanism 3 is arranged so as to overlap, in the depth direction, a partition hinge 81, for a scanner unit 4, that is formed at an upper portion of the printing apparatus 1. The partition hinge 81, which is used when the scanner unit 4 is opened, is formed with a known structure.

Here, the partition hinge 81 is indicated by a rectangular frame 92 for simplification of illustration to describe the overlap in the depth direction. Reference numeral 98 represents a region in which the automatic opening mechanism 3 and the partition hinge 81 overlap.

Figure 15:
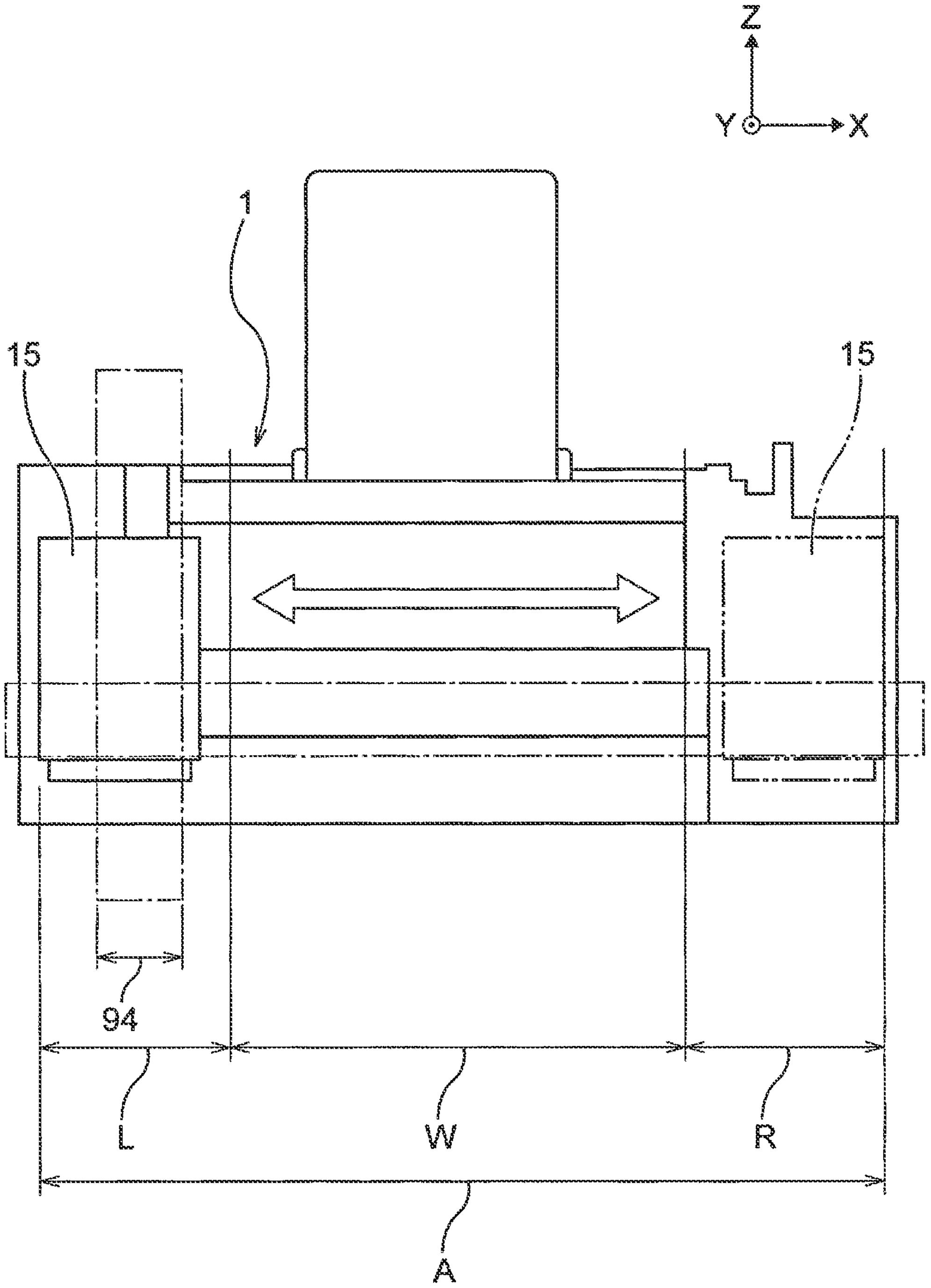
FIG. 15 is a schematic plan view of the relevant portion of the printing apparatus according to the second embodiment.

As illustrated in FIG. 15, which is partially enlarged, in the present embodiment, the automatic opening mechanism 3 is arranged so as to overlap an operation range of the carriage 15 in a moving direction of the carriage. An operation range A of the carriage 15 includes a reciprocation range W when printing is executed, a movement range R on the +X direction side of the range W, and a movement range L on the −X direction side of the range W.

Reference numeral 94 represents a region in which the automatic opening mechanism 3 and the operation range A of the carriage 15 overlap.

Description of Advantages of Embodiment (1) The printing apparatus 1 according to the present embodiment is a printing apparatus 1 including an automatic opening mechanism 3 for an opening/closing cover and a discharge portion 61, for a printed material P, that is exposed in a state in which an opening/closing cover 5 is opened. The automatic opening mechanism 3 includes a lever 11 that is rotated by receiving power of the carriage 15 and that releases maintenance of a closed state of the opening/closing cover 5, and the automatic opening mechanism 3 is arranged so as to overlap a discharge opening region 63 of the discharge portion 61 in a height direction. As a result, an increase in size of the printing apparatus 1 in the height direction can be suppressed.

(2) According to the present embodiment, the printing apparatus 1 further includes a discharge tray 7 that is provided inside the opening/closing cover 5 in a drawable manner and that receives the printed material P discharged in a state in which the discharge tray 7 is drawn out. That is, the apparatus 1 including the discharge tray 7 that receives the printed material P can provide the same advantages as that in (1) using the discharge tray 7 as a receiving portion 64 for the printed material P.

(3) According to the present embodiment, the automatic opening mechanism 3 is arranged so as to overlap, in the height direction, a platen 67 located opposite the print head 65. As a result, an increase in size of the printing apparatus 1 in the height direction can be suppressed.

(4) According to the present embodiment, the automatic opening mechanism 3 is arranged so as to overlap, in the height direction, a disk scale 73 provided on a shaft of a transport roller 75 that transports the printed material P in a transport direction. As a result, an increase in size of the printing apparatus 1 in the height direction can be suppressed.

(5) According to the present embodiment, the automatic opening mechanism 3 is arranged so as to overlap, in the height direction, a motor 69 that is a driving source of a transport roller 75. As a result, an increase in size of the printing apparatus 1 in the height direction can be suppressed.

(6) According to the present embodiment, the automatic opening mechanism 3 is arranged so as to overlap, in the height direction, a gear train 77 that transmits the power of the motor 69. As a result, an increase in size of the printing apparatus 1 in the height direction can be suppressed.

(7) According to the present embodiment, the automatic opening mechanism 3 is arranged so as to overlap an ink supply tube 79 in the depth direction. As a result, an increase in size of the printing apparatus 1 in the depth direction can be suppressed.

(8) According to the present embodiment, the automatic opening mechanism 3 is arranged so as to overlap a partition hinge 81 for a scanner unit 4 of the printing apparatus 1 in the depth direction. As a result, an increase in size of the printing apparatus 1 in the depth direction can be suppressed.

(9) According to the present embodiment, the automatic opening mechanism 3 is arranged so as to overlap an operation range A of the carriage 15 in a moving direction of the carriage 15. As a result, an increase in size of the printing apparatus 1 in the moving direction of the carriage 15 can be suppressed.

Other Embodiments

The automatic opening mechanism 3 for the opening/closing cover 5 and the printing apparatus 1 according to the present disclosure basically include the configuration of any of the embodiments described above. However, it should be understood that the configuration can be, for example, partially changed or omitted without departing from the spirit of the disclosure of the present application.

What is claimed is:

1. A printing apparatus comprising:

an automatic opening mechanism for an opening/closing cover, which is disposed along a first direction;

a carriage that has a print head configured to perform printing on a medium and that moves in a direction intersecting a transport direction of the medium;

a disk scale provided on a shaft of a transport roller that transports a printed medium in a transport direction in a height direction, the automatic opening mechanism overlapping the disk scale; and a discharge portion that is exposed in a state in which the opening/closing cover is opened and that discharges the printed medium, wherein the automatic opening mechanism includes a lever for releasing maintenance of a closed state of the opening/closing cover by movement of the carriage, the automatic opening mechanism overlaps a discharge opening region of the discharge portion in a height direction, the lever is disposed along a second direction perpendicular to the first direction, and when the carriage comes to contact with the lever and causes the lever to rotate, the maintenance of the closed state of the opening/closing cover is released due to the displacement of the lever.

2. The printing apparatus according to claim 1, further comprising:

a discharge tray that is provided inside the opening/closing cover in a drawable manner and that receives a printed material discharged in a state in which the discharge tray is drawn out.

3. The printing apparatus according to claim 1, further comprising a medium support member located opposite the print head in the height direction, the automatic opening mechanism overlapping the medium support member.

4. The printing apparatus according to claim 1, further comprising a motor that is a driving source of the transport roller in the height direction, the automatic opening mechanism overlapping the motor.

5. The printing apparatus according to claim 4, wherein further comprising a power transmission mechanism that transmits power of the motor in the height direction, the automatic opening mechanism overlapping the power transmission mechanism.

6. The printing apparatus according to claim 1, wherein further comprising an ink supply tube that supplies ink to the print head in a depth direction, the automatic opening mechanism overlapping the ink supply tube.

7. The printing apparatus according to claim 1, wherein further comprising a partition hinge, for a scanner unit, that is formed at an upper portion of the printing apparatus in a depth direction, the automatic opening mechanism overlapping the partition hinge.

8. The printing apparatus according to claim 1, wherein further comprising an operation range of the carriage in a moving direction of the carriage, the automatic opening mechanism overlapping the operation range.

* * * * *